(12) United States Patent  (10) Patent No.: US 7,466,432 B2
Mitani  (45) Date of Patent: Dec. 16, 2008

(54) PRINTER DRIVER AND METHOD WITH AUTOMATIC SETTING FEATURE

(75) Inventor: Masateru Mitani, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1059 days.

(21) Appl. No.: 10/750,977

(22) Filed: Jan. 5, 2004

(65) Prior Publication Data

US 2005/0146731 A1    Jul. 7, 2005

(51) Int. Cl.
 *G06F 3/12*   (2006.01)
 *G06F 15/00*  (2006.01)
 *G06K 1/00*   (2006.01)
(52) U.S. Cl. ....................................................... 358/1.1
(58) Field of Classification Search ........................ None
 See application file for complete search history.

(56) References Cited

U.S. PATENT DOCUMENTS 7,057,747 B1 * 6/2006 Minagawa ................. 358/1.13

7,173,730 B1 * 2/2007 Suzuki et al. .............. 358/1.16

FOREIGN PATENT DOCUMENTS

JP    2002-149365 A    5/2002

* cited by examiner

*Primary Examiner*—Twyler L. Haskins
*Assistant Examiner*—Marcus T Riley
(74) *Attorney, Agent, or Firm*—Foley & Lardner LLP

(57) ABSTRACT

A method and apparatus of configuring an image forming apparatus, includes providing a user with a graphical user interface which allows the user to select at least one first imaging option as a selected imaging option, wherein a print or copy job requires selection of the at least one first imaging option and at least one second imaging option. The method and apparatus also includes, based on selection of the at least one first imaging option obtained by way of the graphical user interface, determining a default value for the at least one second imaging option.

24 Claims, 4 Drawing Sheets

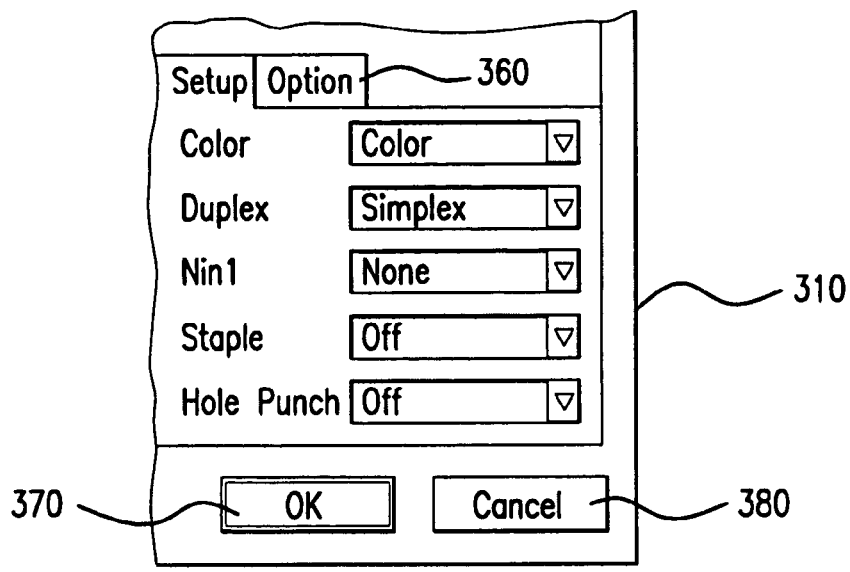
FIG.3
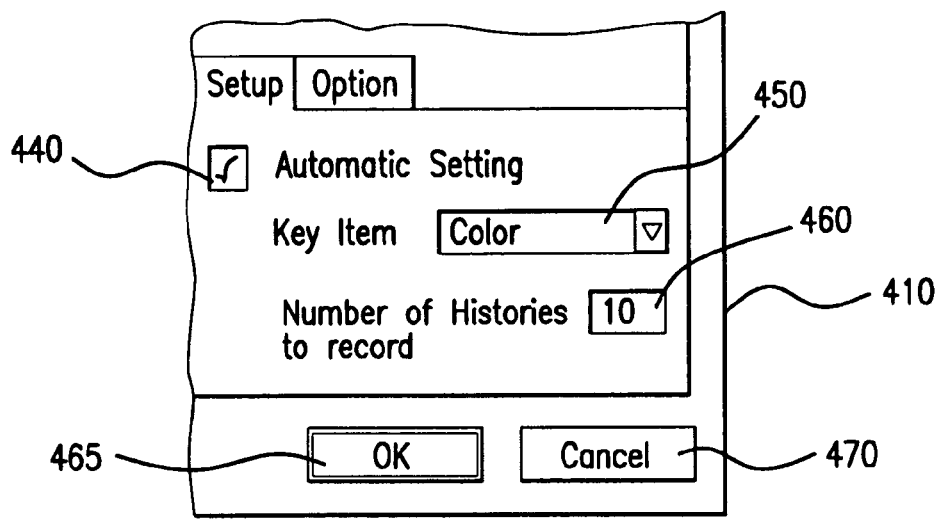
FIG.4
FIG.5

Key Item =   Position = 1

| | Color | Duplex | Nin1 | Staple | Hole Punch |
|---|---|---|---|---|---|
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |

Key Item =   Position = 4

| | Color | Duplex | Nin1 | Staple | Hole Punch |
|---|---|---|---|---|---|
| 1 | Color | Simplex | None | None | None |
| 2 | Color | Simplex | None | None | None |
| 3 | Color | Duplex-Book | None | None | On |
| 4 | | | | | |
| 5 | | | | | |
| 6 | | | | | |
| 7 | | | | | |
| 8 | | | | | |
| 9 | | | | | |
| 10 | | | | | |

Key Item =   Position = 1

| | Color | Duplex | Nin1 | Staple | Hole Punch |
|---|---|---|---|---|---|
| 1 | Color | Simplex | None | None | None |
| 2 | Color | Simplex | None | None | None |
| 3 | Color | Duplex-Book | None | None | On |
| 4 | Color | Simplex | None | None | None |
| 5 | B&W | Duplex-Book | 2in1 | On | None |
| 6 | B&W | Duplex-Book | 2in1 | None | None |
| 7 | Color | Simplex | None | None | On |
| 8 | B&W | Simplex | None | None | None |
| 9 | Color | Duplex-Tablet | None | On | None |
| 10 | B&W | Duplex-Book | 2in1 | None | None |

PRINTER DRIVER AND METHOD WITH AUTOMATIC SETTING FEATURE

FIELD OF THE INVENTION

The present invention relates generally to a printer driver and method, more particularly, to an apparatus and method for automatically setting a print feature based on a different print feature set by a user.

BACKGROUND OF THE INVENTION

In a conventional printer or copier, a user must set different print features (also referred to herein as image options) via a printer driver. FIG. 1 shows a conventional printer driver graphical user interface (GUI) display 110 that allows a user to set a "Color" feature, a "Duplex" feature, a "Nin1" feature, a "Staple" feature, and a "HolePunch" feature, for a given copy or print job. FIG. 2 depicts a table 210 showing the different possible settings that the user can select for each of the different image options.

As shown in FIG. 1, each of the five print options has a default setting, which in the example shown in FIG. 1 corresponds to: Color Mode=Color, Duplex Mode=Simplex, Nin1 Mode=None, Staple Mode=Off, and HolePunch Mode=Off.

When the user performs different print or copy jobs on a printer or copier, and if the user may need to change the printer driver mode select options for each different print or copy job, the user must spend time to select all the print driver mode select operations, which creates an inefficient utilization of the user's time.

Accordingly, there exists a desire to provide default image option settings to more closely match the expected settings for a succeeding print or copy operation.

SUMMARY OF THE INVENTION

According to an aspect of the invention, a method of configuring an image forming apparatus includes setting a first imaging option, based on information provided by a user. The method also includes determining a default setting for a second imaging option from a second group of imaging options, the default setting for the second imaging option being associated with the set first imaging option. The method further includes setting the second imaging option, from the second group of imaging options, based on information provided by the user. The method also includes updating the default setting for the second imaging option based on the set first imaging option and the set second imaging option.

According to another aspect of the invention, an image forming apparatus includes an image former configured to form an image on a media. The apparatus also includes a user interface configured to interface with a user. The apparatus further includes a processor electrically coupled to the user interface and configured to control the image former. The processor is programmed to receive a first imaging option selection from the user interface. The process is also programmed to load a default setting for a second imaging option based on the first imaging option selection. The processor is further programmed to receive a second imaging option selection from the user interface. The processor is still further programmed to update the default setting for the second imaging option based on the first imaging option selection and the second imaging option selection.

Further features, aspects and advantages of the present invention will become apparent from the detailed description of preferred embodiments that follows, when considered together with the accompanying figures of drawing.

BRIEF DESCRIPTION OF THE DRAWINGS

FIG. 3 is a printer driver Setup tab GUI display in accordance with a first embodiment of the invention.

FIG. 4 is a printer driver Option tab GUI display in accordance with the first embodiment of the invention.

FIG. 5 is a table showing the possible settings for the values selectable via the Option tab GUI display in accordance with the first embodiment of the invention.

FIG. 6 is a blank history table utilized in at least one embodiment of the invention.

FIG. 7 is a partially filled history table utilized in at least one embodiment of the invention.

FIG. 8 is a completely filled history table utilized in at least one embodiment of the invention.

DETAILED DESCRIPTION OF THE PREFERRED EMBODIMENT

An aspect of the present invention provides for automation of at least one image setting option of a printer driver, based on both: a) another image setting option selected by the user, and/or b) the image settings made for the at least one image setting option for the N (N being an integer) most recent copy or print operations performed on a printer or copier, or by a user-selected default setting of the at least one image setting option when the another image option is set by the user.

A printer driver allows a user to select various image options for a copy or print operation. Some setting items, such as whether the copy operation is to be Color or Black/White (B/W), are selected by a user based on the print purpose. For example, if a user is printing a document in Draft format, it is likely that the user will utilize the B/W mode (instead of the Color mode) to save on copy costs. Also, it is likely that the Draft document will be printed in 2:1, 4:1, or 8:1 mode (as the selected Nin1 image option), and in Duplex mode, in order to save on print costs (e.g., reduce the number print pages required for the print job).

However, if the user is printing a color document in Final format, such as to be provided to a customer, it is likely that the user will utilize "Color" for Color image option, "None" for the Nin1 image option, and "Simplex" for the Duplex image option. These selections provide a professional print output (e.g., so that the print output can be bound in book form and provided as a formal document to a customer).

Utilizing the relationships of different types of image options previously selected by the user or by other users for previous print or copy jobs performed on a printer or copier or other printers or copiers on a network having plural printers and copiers, aspects of the present invention provide an automated feature that selects default image options based on information obtained from these previous selections.

As explained previously, the conventional printer driver requires that a user set each different image mode individually. The present invention according to at least one embodiment sets at least one image mode based on another image mode set by a user, whereby the setting of the at least one image mode is based on previous settings of that mode made by the user or by other users.

Figures 1, 2:
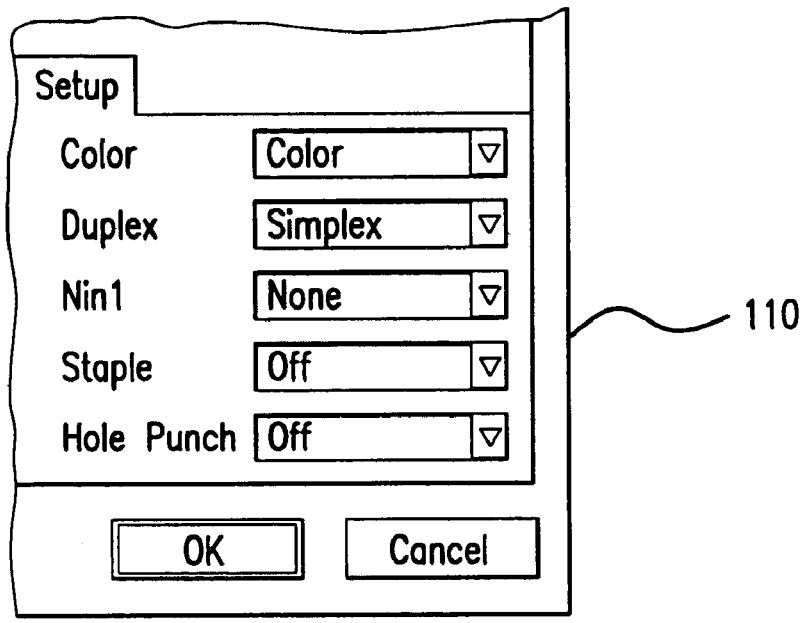
FIG. 1 is a diagram showing a conventional printer driver menu that is provided as a graphical user interface (GUI).
FIG. 2 is a table showing the different possible options that can be selected by a user by utilizing the GUI of FIG. 1.

In a first embodiment of the invention, a user selects a first imaging option as a key item. The user then selects one or more other second imaging options to be paired with the key item, whereby the paired image option data is saved in a memory. For each of these imaging options, a user-selected default setting is provided. For example, assume that there are five different types of imaging options as shown in FIG. 1, and the various possible settings for those imaging options are as shown in FIG. 2. If the user selects "Staple=On" as the key item, such as by way of an Options tab GUI display, the user can then select default settings for one or more of the other four types of imaging options to be paired with the key item. In this example, if the user selects "Hole Punch=On" and "Nin1"__=4in1 to be the default settings when Staple=On (set by way of the Options tab GUI display), then those settings will be automatically selected as default settings on the Setup tab GUI display of FIG. 1 when Staple is selected by the user to be On. For the other two imaging options that were not selected by the user in the Options setting GUI display, those imaging options will be set to their 'standard' default settings (e.g., Color=Color and Duplex=Simplex as shown in FIG. 1), which can be changed by the user in the Setup tab GUI display, if so desired.

FIG. 3 shows a printer driver Setup tab GUI display 310 according to a second embodiment of the invention, in which history information from previous print or copy jobs is utilized to provide default settings for one or more imaging options. The different possible settings for the separate image option boxes in the Setup tab GUI display 310 are the same as provided in FIG. 2. Of course, other types and numbers of image options are possible, while remaining within the scope of the invention.

The Setup tab GUI display 310 has an "Options" tab 360, which causes the Options tab GUI display 410 as shown in FIG. 4 to appear on the display when the Options tab 360 is selected by a user.

When the user has made selections for the image options in the Setup tab GUI display 310, the user can then select the OK button 370 to save those selections for an upcoming print or copy job. Alternatively, the user can select the Cancel button 380 and not save those selections.

FIG. 4 shows a printer driver Option tab GUI display 410 according to the second embodiment of the invention. The Option tab GUI display 410 of FIG. 4 appears on a display (such as a monitor of a PC or a display provided on a copier or printer, by way of the printer driver API) based on a user selecting the "Option tab" 360 in the Setup tab GUI display 310 as shown in FIG. 3. In FIG. 4, the user can select the "Automatic Setting" mode by a point-and-click operation on the Automatic Setting box 440, whereby the Automatic Setting mode is shown as being ON in FIG. 4 (arrow is shown in the Automatic Setting box 440).

In the Option tab GUI display 410 shown in FIG. 4, the user can select a "Key Item" in the Key Item box 450 from a list of possible image options shown in the Key Item portion of the table 510 in FIG. 5. The Key item selected in FIG. 4 is "Color". The user can also select the "Number of Histories to Record" in a "Number of Histories to Record" box 460 in the Option tab GUI display 410. By way of example and not by way of limitation, the "Number of Histories to Record" value is an integer value selectable between 1 and 100 (or selectable between 1 and 10, or selectable between any two integer values).

FIG. 5 shows a table 510 which lists all the possible settings for each of the values that can be selected in the Option tab GUI display 410 shown in FIG. 4. The "Key Item" can be selected to be any one of the five different imaging options shown in FIG. 3. Once the user has made the selections in the Option tab GUI display 410 of FIG. 4, the user selects the "OK" button 465 to save those selections (or select the Cancel button 470 if those selections are not to be saved).

An example of the second embodiment will now be explained based on the Option Tab selections shown in FIG. 4.

FIG. 6 shows a History Table 600 that is capable of storing image option selections made for up to ten (10) most recent print or copy jobs. In FIG. 6, the History Table 600 is empty, which corresponds to its Default state. For example, when the printer driver according to the second embodiment is initially loaded onto a print system, the History Table 600 will be empty, since no print jobs have yet occurred using the printer driver.

FIG. 7 shows the History Table 600 with three (3) records stored therein, and FIG. 8 shows the History Table 600 with ten (10) records stored therein (corresponding to the ten most recent print or copy jobs).

Referring also to FIG. 3 and FIG. 4, each time a user prints with the printer driver in accordance with the second embodiment, selected values in the Setup tab GUI display 310 (e.g., after the "OK" button 370 is selected by the user) are recorded in the History Table 600.

When image option settings for a fourth print job are set (e.g., a user selects the OK button after making the appropriate selections for the five different imaging options shown in the Setup Tab GUI display 310 of FIG. 3), the imaging option settings for that fourth print job are stored in the fourth row of the History Table 600 shown in FIG. 7.

The printer driver according to the second embodiment determines user preference using the information stored in the History Table 600, to thereby provide default image option values to more closely matches what a user may desire for a current copy or print job.

Referring now to FIG. 8, the ten most recent print jobs include six color print jobs and four B/W print jobs. Out of the six color print jobs, four of those jobs are in Simplex mode, one of those jobs is in Duplex-Book mode, and the other one of those jobs is in Duplex-Tablet mode.

With this history, based on the user selections made in the Option tab GUI display 410 shown in FIG. 4, if the Key Item selected is "Color", the Default setting for the Duplex Mode will be Simplex (since it was selected 66.7% of the time when the Color image option was selected).

The printer driver according to the second embodiment can also set the other image option modes based on the information stored in the History Table 600. In particular, using the information shown in FIG. 8, the Nin1 Mode is "None" (since all of the six most recent Color jobs have a "None" Nin1 selection), the Staple Mode is "None" (since there are five "None" selections and one "On" selection for the six most recent Color jobs), and the Hole Punch Mode is None (since there are four "None" selections and two "ON" selections for the six most recent Color jobs).

Thus, referring back to FIG. 3, when the user selects "Color" as the Color imaging option in the Setup tab GUI Display 310, the Default modes for the other four imaging options shown in FIG. 3 will be set to Simplex, None, Off, and Off, respectively (which in this example corresponds to the standard Default settings of the printer driver). Of course, the user can choose to change any or all of these Default options in the Setup tab GUI Display 310 of FIG. 3, if desired.

The user may instead select "B/W" as the Key Item in Options tab GUI Display 410 shown in FIG. 4 instead of "Color". In this example, using the same information shown in the History Table 600 of FIG. 8, the Default mode for the Duplex image option will be selected as "Duplex Book", since three of the four B/W print jobs in the ten previous print jobs were performed in the Duplex Book mode. Also, the Default mode for the Nin1 image option will be set to "2 in1", the Default mode for the Staple image option will be set to "None", and the Default mode for the Hole Punch image option will be set to "None".

Thus, referring back to FIG. 3, when the user selects "B/W" as the Color imaging option in the Setup tab GUI Display 310, the Default modes for the other four imaging options shown in FIG. 3 will be set to Duplex Book, 2in1, None, and None, respectively. Of course, the user can choose to change any or all of these Default options in the Setup tab GUI Display 310 of FIG. 3, if desired.

Another example will be given for a different Key Item being selected by the user. Referring to the Options tab GUI display 410 shown in FIG. 4, assume that the user selects "Staple" as the Key Item. Based on this selection, if the user selects "Staple=ON" in the printer driver Setup tab GUI Display 310, then the Hole Punch Default image option will be set to "None", since the two previous Staple=ON print jobs (of the ten most previous print jobs stored in the History Table 600 of FIG. 8) were performed in the Hole Punch=None mode.

For the other imaging option modes, in a first possible implementation of the second embodiment, since none of those modes has a preferred selection (e.g., Duplex—Book was selected in one Staple=ON print job and Duplex—Tablet was selected in the other Staple=ON print job; and Color mode was selected in one Staple=ON print job and B/W mode was selected in the other Staple=ON print job), the printer driver restores the value in the Color Setup box (in the Setup tab GUI Display 310 shown in FIG. 3) to its default value.

In a second possible implementation, the printer driver leaves the values in those other imaging option boxes unchanged. In this second possible implementation, the current imaging option settings remain unchanged.

In a third possible implementation, the settings for the imaging options that have no preferred choice are set to their corresponding values in the most recent print job. Thus, for the third possible implementation, referring to the information stored in the History Table 600 shown in FIG. 8, the Default Values for the Color mode, the Duplex Mode, and the Nin1 mode would be set to the values shown in the tenth row of the History Table 600.

As a fourth possible implementation, the settings for the imaging options that have no preferred choice are set to the most recent print job that has the same Key Item selection. Thus, in the fourth possible implementation, if the Key Item is Staple and the user selects Staple=ON, then the Color Imaging option Default value, the Duplex imaging option Default value, and the Nin1 imaging option Default value are set to the values shown in the ninth row of the History Table 600.

In a third embodiment of the invention, referring to the Option tab GUI Display 410 shown in FIG. 4, a user may select more than one Key Item (e.g., such as by clicking on one Key Item and then holding down the "Shift" key while clicking on another Key Item in the "Key Item" box 450, using hotkeys, or using other known methods to highlight multiple selections as known to one of ordinary skill in the art), whereby preference information from those combined Key Items are used to select Default values for the other imaging items.

For example, referring again to the History Table 600 shown in FIG. 8, if the user selects both Color and Duplex—Book in the Options tab GUI Display 410, then the Default settings for the other imaging items will be obtained from the one previous print job that is stored in the third row of the History Table 600 of FIG. 8. In particular, the Nin1 Default image option mode is set to None, the Staple Default image option mode is set to None, and the Hole Punch Default image option mode is set to "ON".

With the examples discussed above, in which the user has set the value "10" for the "Number of Histories to Record" box 460 in FIG. 4, when the $11^{th}$ print job imaging options are saved, those values overwrite the oldest record in the History Table 600. Thus, the first row of the History Table 600 is overwritten with the $11^{th}$ print job imaging options. Similarly, the $12^{th}$ print job imaging options will overwrite the (now oldest) values in the second row of the History Table 600, and so on.

Figure 9:
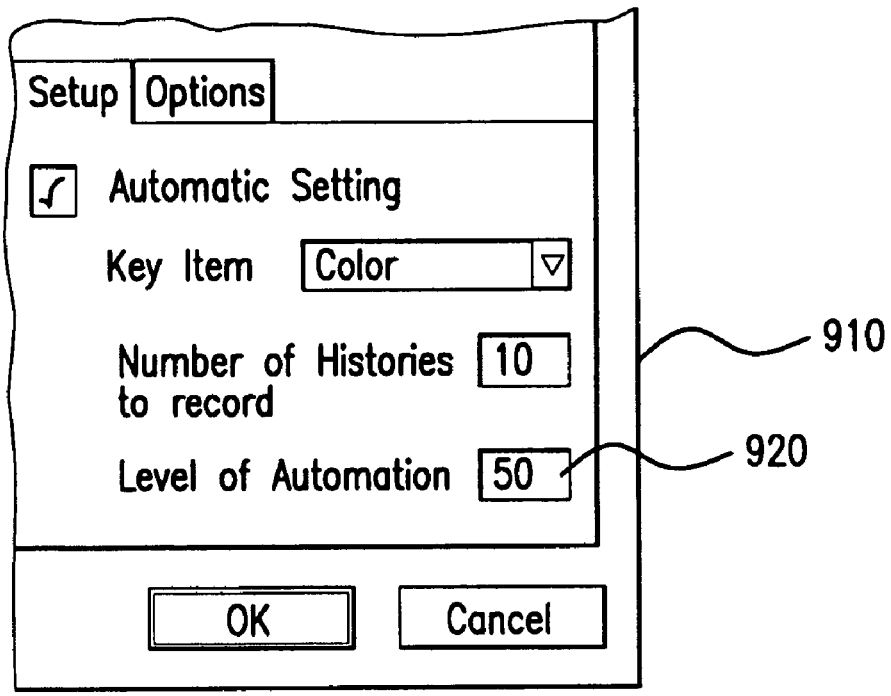
FIG. 9 is a printer driver Option tab GUI display in accordance with a third embodiment of the invention.

In a fourth embodiment of the invention, referring now to FIG. 9, a printer driver Options tab GUI Display 910 is shown, which is similar to the printer driver Options tab GUI Display 410 of FIG. 4, but whereby an additional data item is provided. A "level of automation" box 920 appears in the Options Tab GUI Display 910 when the Automatic Setting option is selected, whereby the user can select a percentage value to be used to compute the most preferred value for an imaging option. For example, if the user selects 50% (whereby the level of automation value is preferably an integer value selectable between 1 and 100%), then automation for a particular imaging option is performed if the most preferred value appears in the History Table 600 more than 50% of the time. Otherwise, automation for that particular imaging option is not performed.

As an example of the operation of the fourth embodiment, referring again to the History Table 600 of FIG. 8, if the Key Item is Color and the user selects Color=Color in the Setup tab GUI Display 310 of FIG. 3 and whereby the user selects 50% as the level of automation value in the Options tab GUI Display 410 of FIG. 4, since Simplex mode was selected for four of the six most recent Color print jobs, then the Default value for the Duplex image option mode is set to Simplex. However, if the user had instead selected 70% as the level of automation value, since the Simplex mode was only chosen 66.7% of the time based on the data obtained from the History Table 600 (4/6=66.7%), then the Default value for the Duplex mode is not automated, but rather is kept at its standard default value.

Figure 10:
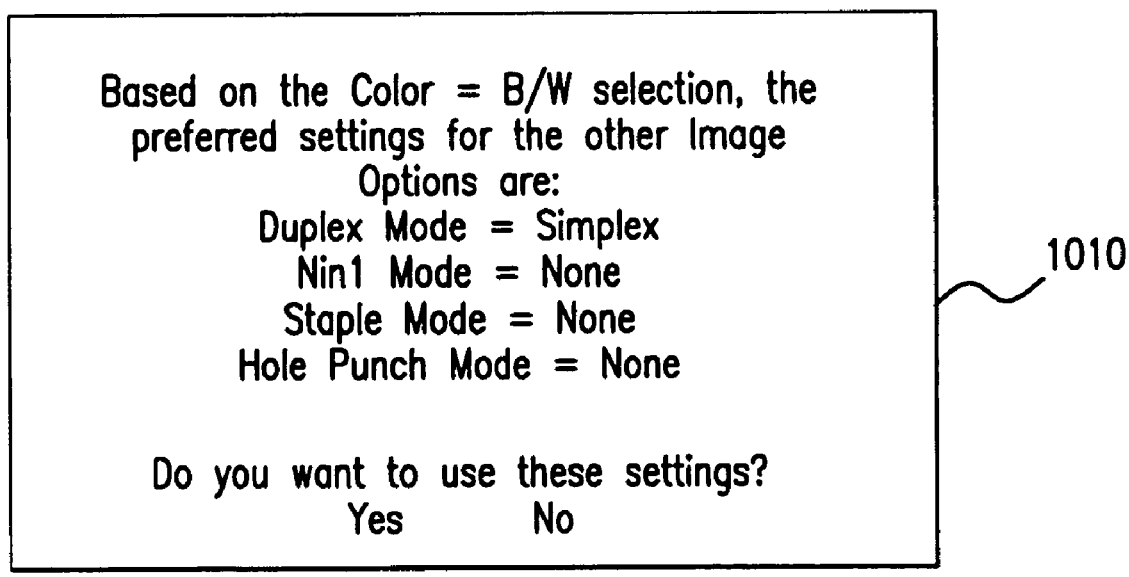
FIG. 10 shows a popup window in accordance with a fourth embodiment of the invention.

In a fifth embodiment of the invention, referring now to FIG. 10, after the user has made his or her imaging option selections from the Setup tab GUI display 310 (and having chosen the Automatic Setting option in the Options tab GUI display 410 or 910), a Confirmation (e.g., a popup window 1010 provided on the copier or printer display) is provided to the user, so as to allow the user to either select the automated imaging options chosen by way of the printer driver in accordance with this embodiment, or to change one or more of them as the user sees fit.

In FIG. 10, the user is provided with confirmation text on a printer or copier display, for example: "Based on the COLOR=B/W selection, the preferred settings for the other Image Options are: Duplex Mode=Simplex, Nin1 Mode=None, Staple Mode=None, Hole Punch Mode=None; Do you want to use these settings Y/N?" If the user selects Y, then the preferred image option settings replace the current settings (which may be default settings or settings actually provided by the user), and if the user selects N, then the preferred image option settings are not implemented.

According to any of the first through fifth embodiments of the invention, the user selects a first imaging option from a user interface, such as the Color Imaging Option=Color from the Setup tab GUI display of FIG. 3. Based on a previous selection of "Color" Imaging Option as being the Key Item, as selected by way of the Options tab GUI display of FIG. 4, default values for one or more of the other imaging options shown in FIG. 3 are set based on information obtained from the History table for the second, third and fourth embodiments, or based on information set by the user in an imaging options setup procedure for the first embodiment (in which history information with regards to previous prints or copy jobs is not utilized). The user can then either agree to those selections by selecting the OK button in FIG. 3, or by changing the Default selection to a different desired selection. In either case, that information is stored and utilized for future print or copy jobs.

The present invention is applicable to print jobs or copy jobs, whereby print jobs can be made by way commands entered by way of a personal computer, or whereby copy jobs can be made by way of a user making selects on a copier panel.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiments (which can be practiced separately or in combination) were chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method of configuring an image forming apparatus, comprising:
   setting a first imaging option, from a first group of imaging options, based on information provided by a user;
   determining a default setting for a second imaging option from a second group of imaging options, the default setting for the second imaging option being associated with the set first imaging option;
   setting, based on information provided by the user, the second imaging option from the second group of imaging options; and
   selectively updating the default setting for the second imaging option based on the set first imaging option and the set second imaging option,
   wherein updating the default setting for the second imaging option comprises updating a history table having a predetermined number of entries of imaging options provided by the user, and
   wherein determining the default setting for the second imaging option comprises determining which second imaging option in the history table is most often provided by the user in combination with the set first imaging option
   wherein determining the default setting for the second imaging option further comprises determining a correspondence frequency of the second imaging option in the history table most often provided by the user in combination with the set first imaging option, and
   wherein updating the default setting for the second imaging option comprises changing the default setting for the second imaging option only if the correspondence frequency is greater than or equal to a predetermined value.

2. The method of claim 1, wherein updating the default setting for the second imaging option comprises updating a user history based on the set first imaging option and the set second imaging option.

3. The method of claim 2, further comprising:
   identifying the user of the image forming apparatus; and
   loading the user history for the identified user.

4. The method of claim 1, wherein the predetermined value is greater than or equal to 50%.

5. The method of claim 1, further comprising:
   determining a default setting for a third imaging option from a third group of imaging options, the default setting for the third imaging option being associated with at least one of the set first imaging option and the set second imaging option;
   setting the third imaging option from the third group of imaging options as selected by the user; and
   selectively updating the default setting for the third imaging option based on the set first imaging option, the set second imaging option, and he set third imaging option.

6. The method of claim 1, wherein the first group of imaging options comprises a color option and black-and-white option.

7. The method of claim 6, wherein the second group of imaging options comprises at least one of a duplex setting, an N-in-1 images setting, a staple setting, and a hole punch setting.

8. The method of claim 4, wherein the first group of imaging options comprises a color option and a black-and-white option, the second group of imaging options comprises at least one of a duplex setting, an N-in-1 images setting, a staple setting, and a hole punch setting, and the third group of imaging options comprises at least one of the duplex setting, the N-in-1 setting, the staple setting, and the hole punch setting,
   wherein the second group of imaging options is different than the third group of imaging options.

9. The method of claim 4, wherein if the set second imaging option is different from the default setting for the second imaging option, the default setting is changed to match the set second imaging option.

10. An image forming apparatus, comprising:
    an image former configured to form an image on a media;
    a user interface configured to interface with a user; and
    a processor electrically coupled to the user interface and configured to control the image former, the processor being programmed to:
    set a first imaging option from a first group of imaging options, based on information provided by the user;
    determine a default setting for a second imaging option from a second group of imaging options, the default setting for the second imaging option being associated with the set first imaging option;
    set the second imaging option from the second group of imaging options, based on information provided by the user; and
    selectively update the default setting for the second imaging option based on the set first imaging option and the set second imaging options, wherein the processor updates the default setting by updating a history table of previous imaging option selections, and wherein the processor loads the default setting for the second imaging option after determining the second imaging option in the history table most often corresponding to the first imaging option selection.

11. The image forming apparatus of claim 10, further comprising a memory for storing default settings for the second imaging option, the processor being electrically coupled to the memory.

12. The image forming apparatus of claim 10, wherein the processor updates the default setting by updating a user history based on the first imaging option selection and the second imaging option selection.

13. The image forming apparatus of claim 12, wherein the processor is further programmed to:
   identify the user via the user interface; and
   load the user history for the identified user.

14. The image forming apparatus of claim 10,
   wherein the processor loads the default setting for the second imaging option after determining a correspondence frequency of the second imaging option in the history table most often corresponding to the first imaging option selection, and
   wherein the processor only loads the second imaging option in the history table most often corresponding to the selected first imaging option if the correspondence frequency is greater than or equal to a predetermined value.

15. The image forming apparatus of claim 10, wherein the processor is further programmed to:
   load a default setting for a third imaging option based on at least one of the first imaging option selection and the second imaging option selection;
   receive a third imaging option selection from the user interface; and
   update the default setting for the third imaging option based on the first imaging option selection, the second imaging option selection, and the third imaging option selection.

16. The image forming apparatus of claim 10, wherein the first imaging option comprises a color/black-and-white setting.

17. The image forming apparatus of claim 10, wherein the second imaging option comprises one of a duplex setting, an N-in-1 setting, a staple setting, and a hole punch setting.

18. A driver for an image forming apparatus, the driver performing method steps of:
   receiving a first imaging option selection for the image forming apparatus;
   loading a default setting for a second imaging option based on the first imaging option selection;
   receiving a second imaging option selection for the image forming apparatus; and
   updating the default setting for the second imaging option based on the first imaging option selection and the second imaging option selection,
   wherein updating the default setting comprises updating a history table of previous imaging option selections, and
   wherein loading the default setting for the second imaging option comprises determining the second imaging option in the history table most often corresponding to the first imaging option selection.

19. The driver of claim 18, wherein loading the default setting for the second imaging option further comprises:
   determining a correspondence frequency of the second imaging option in the history table most often corresponding to the first imaging option selection; and
   loading the second imaging option in the history table most often corresponding to the first imaging option selection only if the correspondence frequency is greater than or equal to a predetermined value.

20. A method of configuring an image forming apparatus, comprising:
   providing a user with a graphical user interface which allows the user to select at least one first imaging option as a selected imaging option, wherein a print or copy job requires selection of the at least one first imaging option and at least one second imaging option;
   based on selection of the at least one first imaging option obtained by way of the graphical user interface, determining a default value for the at least one second imaging option; and
   obtaining a user history of imaging option selections made in previous print jobs for the at least one first imagine option and the at least one second imaging option,
   wherein the default value for the at least one second imaging option is determined based on the user history
   wherein determining the default setting for the second imaging option further comprises determining a correspondence frequency of the second imaging option in the history table most often provided by the user in combination with the set first imaging option, and
   updating the default setting for the second imaging option by changing the default setting for the second imaging option only if the correspondence frequency is greater than or equal to a predetermined value.

21. The method of claim 20, wherein the default value for the at least one second imaging option becomes a selected value for the at least one second imaging option if a user does not override the default value by way of an entry made via the graphical user interface.

22. The method of claim 20, wherein the at least one first imaging option includes at least one of Color mode, Duplex mode, Nin1 mode, Staple mode, and Hole Punch mode.

23. The method of claim 20, wherein the at least one second imaging option includes at least one of Color mode, Duplex mode, Nin1 mode, Staple mode, and Hole Punch mode.

24. The method of claim 20, further comprising:
   identifying the user of the image forming apparatus; and
   loading the user history for the identified user.

* * * * *